UNITED STATES PATENT OFFICE.

GEORGE W. NELSON, OF KAUFFMAN'S STATION, PENNSYLVANIA, ASSIGNOR TO NELSON & CO., OF SHIPPENSBURG, PENNSYLVANIA, A COPARTNERSHIP.

BUTTER-TREATING COMPOUND.

SPECIFICATION forming part of Letters Patent No. 726,334, dated April 28, 1903.

Application filed May 9, 1902. Serial No. 106,642. (No specimens.)

*To all whom it may concern:*

Be it known that I, GEORGE W. NELSON, a citizen of the United States, residing at Kauffman's Station, in the county of Franklin, State of Pennsylvania, have invented certain new and useful Improvements in Butter-Treating Compounds; and I do hereby declare the following to be a full, clear, and exact description of the invention, such as will enable others skilled in the art to which it appertains to make and use the same.

This invention relates to compounds for treating butter; and it has for its object to provide a compound which may be added to the cream prior to the manufacture of the butter and which will have the effect of purifying and deodorizing the butter, while insuring a pleasant and agreeable taste and contributing thereto a desirable color.

Other objects and advantages of the invention will be understood from the following description and include a method of manufacturing butter which will insure the objectionable matter passing off with the buttermilk.

The compound employed consists of the following ingredients or their equivalents—namely, saltpeter, alum, bicarbonate of soda, saffron, and extract of carrots.

In preparing the compound to one gallon of water are added eight ounces of saltpeter, eight ounces of alum, two ounces of bicarbonate of soda, two drams of saffron, and three drams of extract of carrots, formed by boiling the carrots in water and then concentrating the product after straining. The various ingredients mentioned are boiled in the water for fifteen minutes, so as to cause them to thoroughly dissolve and combine, after which the compound is ready for use.

In the use of the compound it is added to the cream directly after the latter comes from the separator and prior to the churning operation, so that the cream "seasons" with the compound in it.

In treating one gallon of cream two drams of the compound are added to four ounces of water, and the whole is then poured into one gallon of cream, and the cream is permitted to stand for six hours. At the end of six hours the cream is ready to be churned into butter, the churning operation being performed in the usual manner.

It is found that in the churning operation the buttermilk separates from the butter, and the effect of the compound is such that the bad-smelling matter and unpleasantly-flavored matter—such as is incident to fresh grass, garlic, and the like—is driven off from the butter product and is carried off by the buttermilk. The bicarbonate of soda when combined with the saltpeter has the effect of eliminating the bad odors and flavor, while the extract of carrots contributes a pleasant flavor. The alum acts as a precipitant, the precipitate passing off with the buttermilk, while the saffron in conjunction with the extract of carrots gives color to the product.

It will be understood that in practice variations in the specific ingredients and their proportions may be made and that their equivalents may be substituted for them.

What is claimed is—

1. A compound for transferring objectionable flavors from the cream to the buttermilk in the process of churning, consisting of the ingredients and proportions substantially as follows, bicarbonate of soda, two ounces; saltpeter, eight ounces; alum, eight ounces; saffron, two drams and extract of carrots, three drams.

2. The method of purifying and deodorizing butter during the churning operation which consists in adding to new cream, a compound consisting of two ounces bicarbonate of soda; eight ounces of alum; eight ounces of saltpeter; two drams of saffron and three drams of extract of carrots, permitting the compound to stand for approximately six hours and subsequently churning the cream, whereby the said impurities and odors will be separated in the buttermilk from butter.

In testimony whereof I affix my signature in presence of two witnesses.

GEORGE W. NELSON.

Witnesses:
GEO. H. CHANDLEE,
F. E. DIMMICK.